US011883937B2

(12) United States Patent
Buchanan

(10) Patent No.: US 11,883,937 B2
(45) Date of Patent: Jan. 30, 2024

(54) HAND OPERATED GRIPPING TOOLS

(71) Applicant: Nigel Buchanan, Fife (GB)

(72) Inventor: Nigel Buchanan, Fife (GB)

(*) Notice: Subject to any disclaimer, the term of this patent is extended or adjusted under 35 U.S.C. 154(b) by 153 days.

(21) Appl. No.: 17/175,933

(22) Filed: Feb. 15, 2021

(65) Prior Publication Data

US 2021/0276158 A1 Sep. 9, 2021

Related U.S. Application Data

(63) Continuation of application No. 16/083,174, filed as application No. PCT/GB2017/050613 on Mar. 7, 2017, now abandoned.

(30) Foreign Application Priority Data

Mar. 7, 2016 (GB) ..................................... 1603926

(51) Int. Cl.

| | |
|---|---|
| ***B25B 7/12*** | (2006.01) |
| ***B25B 5/06*** | (2006.01) |
| ***B25G 1/00*** | (2006.01) |
| ***B25B 7/14*** | (2006.01) |
| ***B25B 5/12*** | (2006.01) |

(52) U.S. Cl.

CPC ................ *B25B 7/12* (2013.01); *B25B 5/068* (2013.01); *B25B 5/127* (2013.01); *B25B 7/14* (2013.01); *B25G 1/005* (2013.01)

(58) Field of Classification Search

CPC .. B25B 7/123; B25B 7/02; B25B 7/04; B25B 7/10; B25B 7/12; B25B 7/14; B25B 5/06; B25B 5/068; B25B 5/12; B25B 5/127; B25B 13/22; B25B 13/12; B25B 13/5058;

(Continued)

(56) References Cited

U.S. PATENT DOCUMENTS 610,831 A * 9/1898 Roberts .................. B25B 13/18 81/391

2,149,541 A 3/1939 Nagle (Continued)

FOREIGN PATENT DOCUMENTS

WO 2015138223 A1 9/2015

OTHER PUBLICATIONS

PCT Search Report and Written Opinion of International Application No. PCT/GB2017/050613, dated Sep. 25, 2017, 19 pages.

*Primary Examiner* — Robert J Scruggs

(74) *Attorney, Agent, or Firm* — Patterson Intellectual Property Law, PC; Emily A. Shouse

(57) ABSTRACT

The main fixed handle optionally incorporates two swivel out arms, which can form part of a three-legged base. When operated thus, the jaws and moving handle point generally upwards from the formed base, the moving handle can now be operated by one hand leaving the other free to position the workpiece. The moving handle can incorporate a further locking switch that can be utilised in both a switchable locking position or non-locking position upon a sprung toothed strut between the handles, at least one of which further incorporates a curved resilient portion in order to provide useful sprung closure of the parallel moving jaws upon the workpiece in the locking method. A lanyard can be optimally attached to the swivel out arm ends to provide the user with a chest mounted portable vice.

7 Claims, 12 Drawing Sheets

(58) Field of Classification Search
CPC ......... B25B 13/46; B25B 13/14; B25B 13/16; B25G 1/005; B25G 1/10
See application file for complete search history.

(56) References Cited

U.S. PATENT DOCUMENTS

| | | | | |
|---|---|---|---|---|
| 6,205,892 | B1 * | 3/2001 | Davidson | B25B 13/18<br>81/309 |
| 8,485,073 | B1 | 7/2013 | Lopez | |
| 2003/0037643 | A1 * | 2/2003 | Hess | B25G 1/005<br>81/177.5 |
| 2007/0000097 | A1 * | 1/2007 | Smith | B25G 1/005<br>16/436 |

* cited by examiner

HAND OPERATED GRIPPING TOOLS

CROSS-REFERENCES TO RELATED APPLICATIONS

This application claims benefit of the following patent application(s) which is/are hereby incorporated by reference: U.S. Ser. No. 16/083,174 filed Sep. 7, 2018; PCT/GB2017/050613 filed Mar. 7, 2017; and GB1603926.5 filed Mar. 7, 2016.

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND OF THE INVENTION

The invention relates to hand operated gripping tools, gripping tools that are adjustable within the range of the jaws of the tool. One form of hand operated gripping tool is colloquially known as water pump pliers or of the locking type generally referred to as pliers or vice grip pliers as they are commonly known.

The invention further relates generally to pliers and also to pliers used to lock their grip upon articles of various sizes and shapes within the confines of the pliers jaw gap sizes.

Pliers of various types are well known in the art. Pliers in general are used for cutting or gripping, whilst some pliers incorporate locking mechanisms the generic name being “vice grips”. These pliers are used to clamp parts together whereas usually the pliers attach themselves to the parts that are being clamped. Small parts that are clamped are held by the jaws and positioned by the manual gripping of the handles.

Existing Water Pump pliers have the common characteristic of jaws offset at an angle to the Plier handles and a pivot post, in the form of a bolt or rivet, mounted in the area rearward of the jaw on one of the handles and projecting through an elongate slot on the other handle. In such pliers, means for enabling selective spacing of the distance between the jaws is variously provided by spaced apart ridges or teeth along the inside long edge of the slot adapted for incremental selective binding engagement with the pivot post. Another well-known method of providing distance adjustment between the jaws in such pliers is the provision of spaced apart arcuate ridges on the interfacing surfaces adjacent to the pivot point. All such tools in order to be adjusted to the size of a particular workpiece to be gripped between the jaws, require a two-handed operation when the handles are pulled apart to permit a sliding action of the pivot post along the slot to move the jaws to approximately the desired workpiece size.

Further types of pliers are adapted to slideably close upon a workpiece in response to manual closing of the handles and, in response to contact with the workpiece, automatically lock against further sliding action by engaging suitable teeth and thereby shift from a sliding to a pivoting mode whereby continued exertion of manual force on the handles increases the gripping action upon the workpiece.

This gripping action upon the workpiece is a function of the relationship between the length of the operating handles and the length of the jaws pivoting around the pivot post typically in a ration of around 5:1 therefore a considerable portion of the torque applied to the operating handle or handles is required to grip the workpiece to be operated meaning the workpiece can seldom be operated by such a device if it is itself tight to operate. In certain circumstances, it would be a considerable advantage if the pliers could be locked upon the workpiece. The existing designs are unable to include this function.

The pivot post locking action, whether by spaced apart ridges, teeth, or arcuate ridges on the inwards facing surfaces means that the jaws/handles are seldom in the optimum position prior to the shift from sliding to a pivoting mode which results in a variable gripping action upon the workpiece.

Existing locking pliers such as US2015283681, US2015273664 comprise two robust handles connected to two robust jaws, and a locking mechanism connected to the two jaws. The handles can be squeezed to close the jaws. The locking member is attached to an over centre linkage which when utilized prevents the lower handle from pivoting from its closed configuration and until opened retaining the jaws in a closed position. The clamping width of the jaws is adjusted by an adjustment screw, the adjustment screw further determining the clamping pressure exerted upon the clamped workpiece. As the clamping pressure has to be pre-set it can take several attempts to correctly adjust the screw to the required position in order to clamp the workpiece the best way. The clamping width of the jaws once set by the adjusting screw is finite, any movement, vibration or relaxing of the clamped material normally results in the failure of the clamping action. This is most prevalent when the device is used to initially clamp bodywork parts during a panel beating process prior to welding or bolting the panels being worked on. Inadvertent over pressure applied by the clamping jaws usually results in damage or distortion of the clamped parts.

USD742194 shows a set of pliers having a toothed strut with a locking mechanism attached to one operating arm. As the arms are closed the teeth “ratchet” past the lock. As the operating arms are not designed to resiliently deform during robust operation, the toothed arc of the strut remains in substantially the same locking angle relative to the locking mechanism.

EP2818280 comprises pliers or clamps having a bow or arcuate portion to permit limited flexing of one of the handles. A pivotal strut is retained between the handles and the strut is slidably held in a channel within one handle and pivotally held within the other handle. The pivotal end of the strut has a toothed arc, which acts with a switched pawl to lock or unlock the handle positions relative to one another. Compression of the handles closes the gap between the fixed and moveable jaws, the moveable jaw sliding up a clamp bar portion until the jaws robustly contact the workpiece, the further operation of the handles resulting in the clamping of the workpiece, the resilient arcuate portion acting to impose a limited sprung grip upon the workpiece, further usefulness imported by the locking action of the pawl teeth within the strut arc teeth when the pawl is switched into its ratchet locking position retaining the handles substantially in their closed position providing a limited spring grip upon the workpiece. The arc of the toothed strut in conjunction with the corresponding toothed arc of the pawl being capable of compensating for the changes in angles of one handle relative to the other as the resilient portion flexes as differing pressures are applied to the handles during use, any normal locking switch being rendered suspect as the angle of one locking tooth to the other changing as the handle flexes, which may prevent the teeth interlocking sufficiently to provide a dependable locking mechanism.

It is an object of the invention to at least partially alleviate at least one of the above-mentioned disadvantages, or to provide an alternative to existing products.

BRIEF SUMMARY OF THE INVENTION

The invention provides a hand operated gripping tool comprising a fixed handle, a fixed jaw connected with said fixed handle, a movable handle pivotably connected with said fixed handle for pivoting movement relative to said fixed handle and a movable jaw connected with said movable handle for movement relative to said fixed jaw, wherein said fixed handle comprises first portion to which said fixed jaw is fixed and second and third portions movable from a first position in which each forms a continuation of said first portion and a spread position in which said first second and third portions define a tripod base.

In some examples said second and third portions are pivotably connected with a first end of said first portion.

In some examples said fixed jaw is fixed to said first portion at a second end of said first portion.

In some examples said movable jaw is slideable on said fixed handle towards said fixed jaw in response to movement of said movable handle towards said fixed handle.

In some examples said movable handle is pivotably connected with said fixed handle via said movable jaw.

Some examples further comprise a locking mechanism to lock said second and third portions in said first position.

The invention also includes hand operated gripping tool comprising a fixed handle, a fixed jaw connected with said fixed handle, a movable handle pivotably connected with said fixed handle for pivoting movement relative to said fixed handle and a movable jaw connected with said movable handle for movement relative to said fixed jaw, wherein said movable jaw is mounted for sliding movement on said fixed handle.

In some examples said movable handle is pivotably connected with said fixed handle via a pivot pin received in an aperture provided in said movable jaw.

Some examples may further comprise a biasing member disposed between said fixed and movable handles to bias said movable handle away from said fixed handle.

In some examples said biasing member is configured to resist movement of said movable handle towards said fixed handle such that a user applied force applied to said movable handle towards said fixed handle is resisted and causes said movable handle and movable jaw to move towards said fixed jaw.

Some example may further comprise a strut having a first end pivotably connected with said fixed handle and a locking switch pivotably connected with said movable handle, wherein said strut has a first side provided with a plurality of teeth, said locking switch comprises at least one tooth that is engageable with said teeth provided on said strut and, in use, when movement of said movable jaw towards said fixed jaw is blocked by a workpiece disposed between said jaws said user applied force applied to said movable handle causes said movable handle to move towards said fixed handle causing said strut to pivot towards said fixed jaw and said at least one tooth on said locking switch to ratchet along said plurality of teeth on said strut.

In some examples said biasing member comprises a spring, said strut extends through said spring and said spring engages said locking switch to bias said at least one tooth into engagement with said plurality of teeth on said strut.

In some examples said strut has a second side disposed opposite said first side and said movable handle is provided with a bearing surface engaging said second side to control said pivoting movement of said strut towards said fixed jaw.

In some examples said locking switch further comprises a guide face and said guide face is configured such that pivotal movement of said locking switch by a user applied force to release said at least one tooth from engagement with said teeth on said strut causes said guide face to engage said strut to cooperate with said bearing surface to define a channel through which said strut slides guided by said bearing surface and guide face when, in use, said movable handle moves away from said fixed handle.

In some examples said movable handle comprises a flexure portion configured to allow flexing of the movable handle in response to said user applied force when movement of said movable handle towards said fixed handle is prevented by said workpiece held between said jaws whereby said at least one tooth engaged with said teeth on said strut can be moved at least one strut tooth closer to said first end.

Some examples may further comprise a plurality of spring members having a first end pivotally attached to said movable jaw and a second end fixed to said flexure portion, wherein said spring members have respective elongate apertures that receive said pivot pin and said elongate apertures have different lengths.

In some examples at least one of said jaws has a mounting for a removable insert that defines at least one of:

i) at least one cutting edge; and ii) at least one face defining an anvil.

In some examples said fixed handle comprises first portion to which said fixed jaw is fixed and second and third portions movable from a first position in which each forms a continuation of said first portion and a spread position in which said first second and third portions define a tripod base.

The invention also includes a hand operated gripping tool comprising a fixed handle, a fixed jaw connected with said fixed handle, a movable handle pivotably connected with said fixed handle for pivoting movement relative to said fixed handle, a movable jaw connected with said movable handle for movement relative to said fixed jaw, a strut having a first end pivotably connected with said fixed handle and having a first side provided with a plurality of teeth, a locking switch having at least one tooth engageable with said teeth on said strut and a biasing member biasing said locking switch so that when, in use, a user applied force causes said movable handle to move towards said fixed handle said at least one tooth ratchets over said teeth on said strut, wherein said movable handle comprises a flexure portion configured to allow flexing of the movable handle in response to said user applied force when movement of said movable handle towards said fixed handle is prevented by resistance provided by a workpiece held between said jaws whereby said at least one tooth engaged with said teeth on said strut can be moved at least one strut tooth closer to said first end.

In some examples said movable handle is pivotably connected with said fixed handle via said movable jaw.

In some examples said movable handle is connected with said movable jaw by a pivot pin and further comprising a plurality of spring members having a first end pivotally attached to said movable jaw by said pivot pin and a second end fixed to said flexure portion, wherein said spring members have respective elongate apertures that receive said pivot pin and said elongate apertures have different lengths so as to be progressively engageable by said pivot pin to provide a progressive increasing spring rate.

BRIEF DESCRIPTION OF THE SEVERAL VIEWS OF THE DRAWINGS

In order that the invention may be well understood, some examples thereof, which are given by way of example only, will now be described with reference to the drawings in which.

REFERENCE TO THE DRAWINGS

Figure 1:
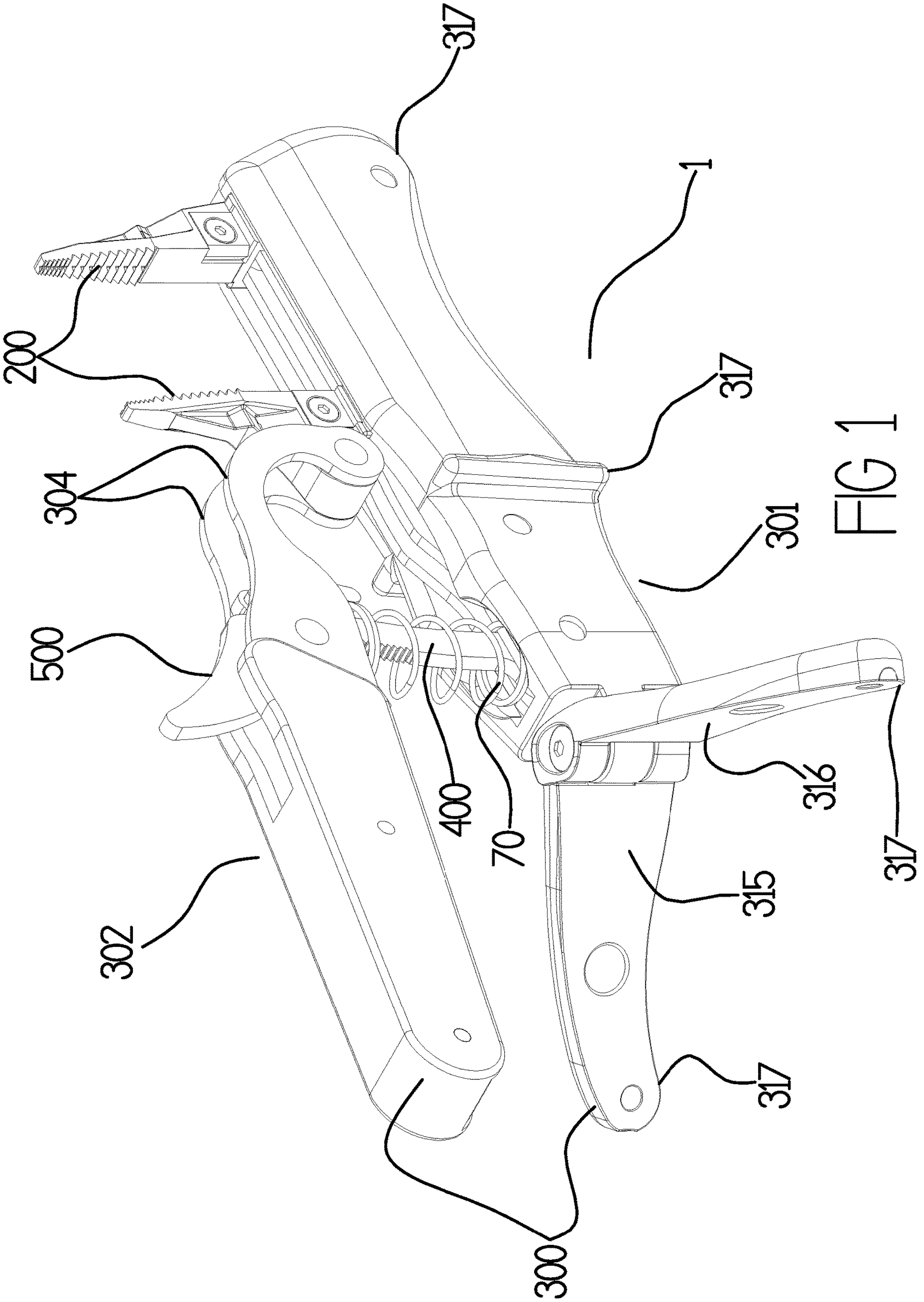
FIG. 1 is a perspective view of the pliers from the front, the pliers are in the open position, the fold out legs are also in the open position.

Following is a listing of the various components used in the illustrated examples. For the ready reference of the reader the reference numerals have been arranged in ascending numerical order.

| | |
|---|---|
| 1 | Portable Vice Pliers |
| 70 | Strut Spring |
| 72 | Strut Spring Ends |
| 80 | Workpiece |
| 81 | Fishing Hook |
| 90 | Snip Portion |
| 91 | Snip Portion Cutting Face |
| 92 | Snip Portion Anvil |
| 93 | Snip Fixing Bore |
| 94 | Lanyard |
| 200 | Head Portion |
| 201 | Fixed Jaw |
| 202 | Moving Jaw |
| 203 | Gripping Face |
| 204 | Assembly Holes |
| 205 | Jaw Fulcrum Pin Retention Hole |
| 206 | Fixed Jaw Slide Bar Portion |
| 207 | Fixed Jaw Slide Bar Junction |
| 208 | Fixed Jaw Slide Bar Recess |
| 209 | Fixed Jaw Slide Bar Jaw Fixing Holes |
| 210 | Slide Bar to Fixed Jaw Fixing Hole |
| 211 | Cutting Portion Recess |
| 212 | Cutting Portion Recess Screw Bore |
| 215 | Fixed Jaw Housing Retaining Hole |
| 216 | Gripping Face Lateral Groove |
| 217 | Moving Jaw Gripping Face Lateral Groove |
| 218 | Moving Jaw Slide Bar Recess |
| 219 | Moving Jaw Pivot Hole |
| 220 | Gripping Face Teeth |
| 221 | Fixed Jaw Slide Bar Housing |
| 222 | Moving Jaw Slide Bar Housing |
| 300 | Handle Portion |
| 301 | Fixed Handle |
| 302 | Moving Handle |
| 303 | Handle Clenching Grips |
| 304 | Handle Bend Promoting Portions |
| 305 | Assembly Holes |
| 306 | Strut Pivot Pin Holes |
| 307 | Switch Pivot Pin Holes |
| 308 | Fixed Handle Inner Plates |
| 309 | Moving Handle Inner Plates |
| 310 | Moving Handle Outer Plates |
| 311 | Fixed Handle Outer Plates |
| 312 | Fixed Handle Inner Surface |
| 313 | Fixed Handle Moulded Cover |
| 314 | Moving Handle Moulded Cover |
| 315 | Fixed Handle First Fold Out Leg |
| 316 | Fixed Handle Second Fold Our Leg |
| 317 | Handle Base Feet |
| 318 | Handle Leg Locking Protrusions |
| 319 | Handle Leg Locking Indentations |
| 320 | Handles Leg Locking Magnets |
| 321 | Handle Magnets |
| 322 | Fixed Handle Stop |
| 323 | Fixed Handle Lanyard Attachment Hole |
| 324 | Moving Handle Jaw Pivot Hole |
| 325 | Further Bent Promoting Lamination with an Elongate Jaw Pivot Hole |
| 326 | Further Bent Promoting Lamination with a Further Jaw Elongate Pivot Hole |
| 327 | Further Bent Promoting Lamination with an Even Further Elongate Pivot Hole |
| 328 | Lamination Elongate Pivot Hole |
| 329 | Fixed Handles Top Protrusion |
| 331 | Fixed Handle Frame |
| 332 | Moving Handle Frame |
| 333 | Fold Out Leg Stops |
| 334 | Fixed Handle Fold Out Leg Stops |
| 400 | Pivotal Strut |
| 401 | Strut Toothed Face |
| 402 | Strut Teeth |
| 403 | Strut Back Face |
| 404 | Strut Pivot Pin Hole |
| 405 | Strut Outer End |
| 406 | Strut Stop |
| 500 | Pivotal Switch |
| 501 | Pivotal Actuator |
| 502 | Actuator Pivot Hole |
| 503 | Smooth Guide Portion |
| 504 | Spring Operating Face |
| 505 | Toggle Lever |

-continued

| | |
|---|---|
| 506 | Locking Teeth |
| 507 | Locking Stop |
| 508 | Pivotal Switch Housing |
| 509 | Housing Guide Block Face |
| 510 | Housing Strut Channel |
| 511 | Housing Spring Alignment Projection |
| 514 | Housing Outer Laminates |
| 515 | Housing Inner Recess |
| 600 | Jaw Fulcrum Pin |
| 601 | Switch Pivot Pin |
| 602 | Strut Pivot Pin |
| 603 | Fixings |
| CF | Clenching Force |
| GF | Gripping Force |
| PFT | Pivotal Force Triangle |
| (a) | Angle a |
| (b) | Angle b |
| (c) | Angle c |
| A | Side A |
| B | Base B |
| C | Base C |

DETAILED DESCRIPTION OF THE INVENTION

FIG. 1 is a perspective view of the pliers 1 from the front, the jaws 200 and handles 300 are in the open position, the fold out legs 315, 316 are also in the open position, the said pliers base feet 317 resting on a surface. Further illustrated is the switch mechanism 500, also the toothed strut 400 with its spring 70 between the fixed handle 301 and the moving handle 302. The moving handle 302 incorporating the bend promoting portions 304.

Figure 2:
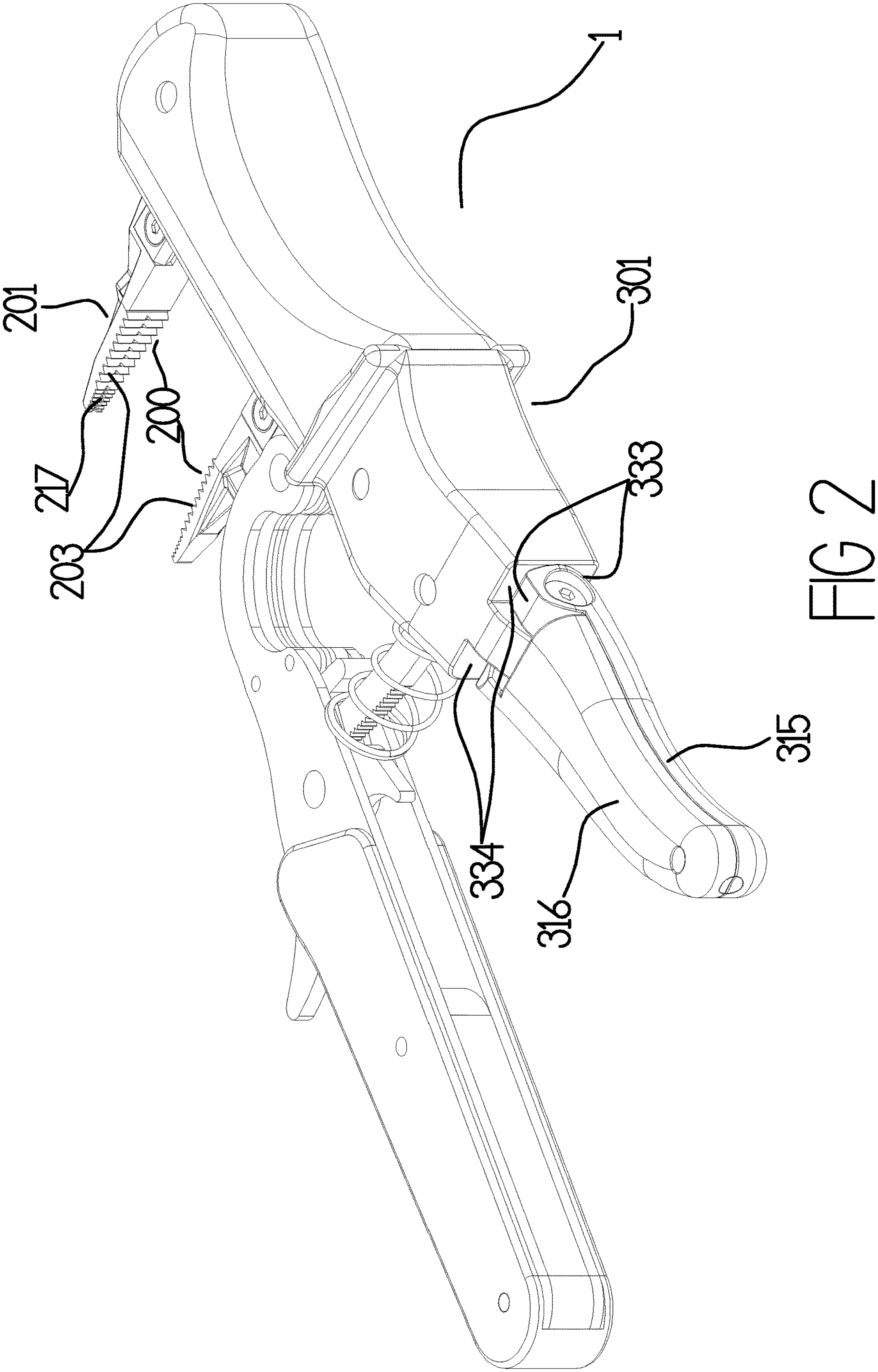
FIG. 2 is a perspective view of the pliers from the rear, the legs of the fixed handle are illustrated closed and the jaws open.

FIG. 2 is a perspective view of the pliers 1 from the rear, the legs 315, 316 illustrated closed, the leg stops 333 are abutting the corresponding fixed handle 301 leg stops 334, and the jaws 200 open. The Jaw gripping faces 203 are shown, the lateral groove 217 further illustrated. The pliers 1 are at rest.

Figure 3:
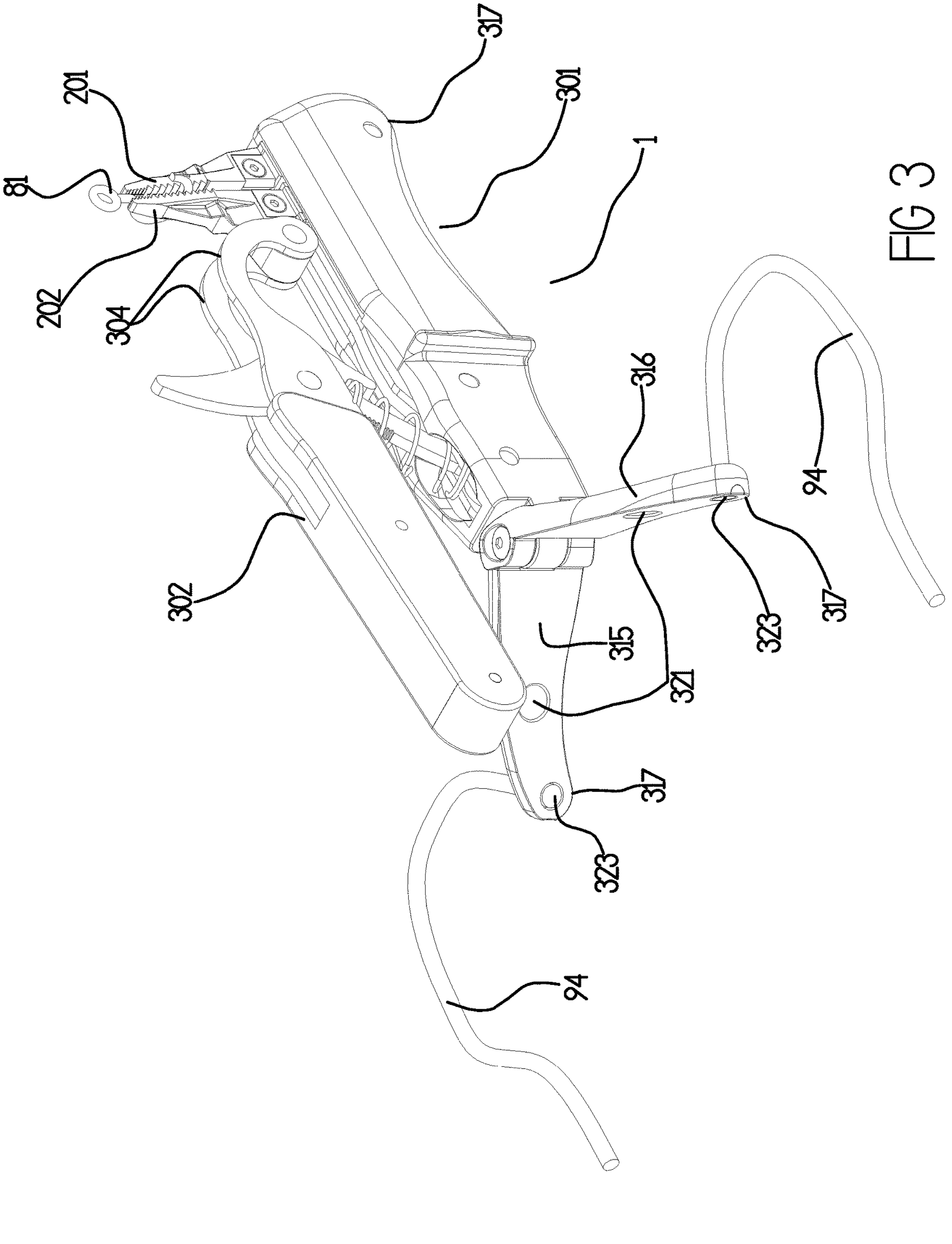
FIG. 3 is a perspective view of the pliers from the front, the legs of the fixed handle are illustrated open with a lanyard attached, the pliers are operated and the jaws gripping a fishing hook.

FIG. 3 is a perspective view of the pliers 1 from the front, the legs 315,316 of the fixed handle 301 are illustrated open with a lanyard 94 attached within the lanyard attachment hole 323, the moving handle 302 with its bend promoting portion 304 is operated and the jaws 201, 202 gripping a fishing hook 81. Further shown are the fixed handle base feet 317 and the closure magnets 321.

Figure 4:
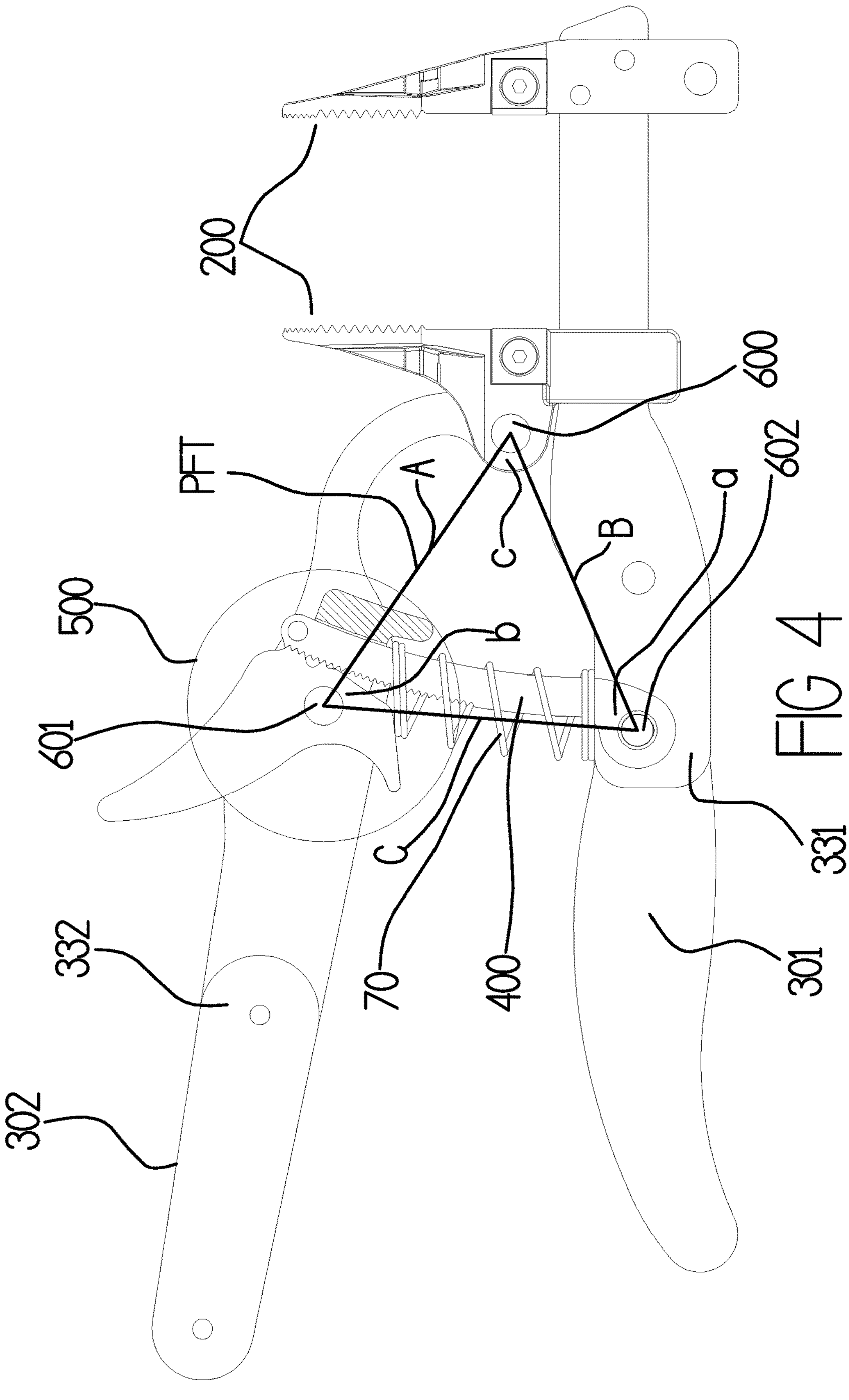
FIG. 4 is a schematic plan view of the inner metal frame and jaws of the pliers, without the handle covers, the moving handle, fixed handle outer handle plates and switch top outer housing laminate are shown removed for display purposes. The pliers are at rest.

FIG. 4 is a schematic plan view of the inner metal frame 331, 332 and jaws 200 of the pliers 1, without the handle covers (not shown), the moving handle 302, fixed handle 301 outer handle plates 310, 311 and switch top outer housing laminate 514 (not shown) removed for display purposes. The pliers 1 are at rest illustrating the initial pivotal force triangle PFT comprising the moving jaw pivot pin 600 (*c*) with a force line A to the switch pivot pin 601 (*b*) which has a further force line C to the strut pivot pin 602(*a*). The pivotal switch 500 shown closed.

Figure 5:
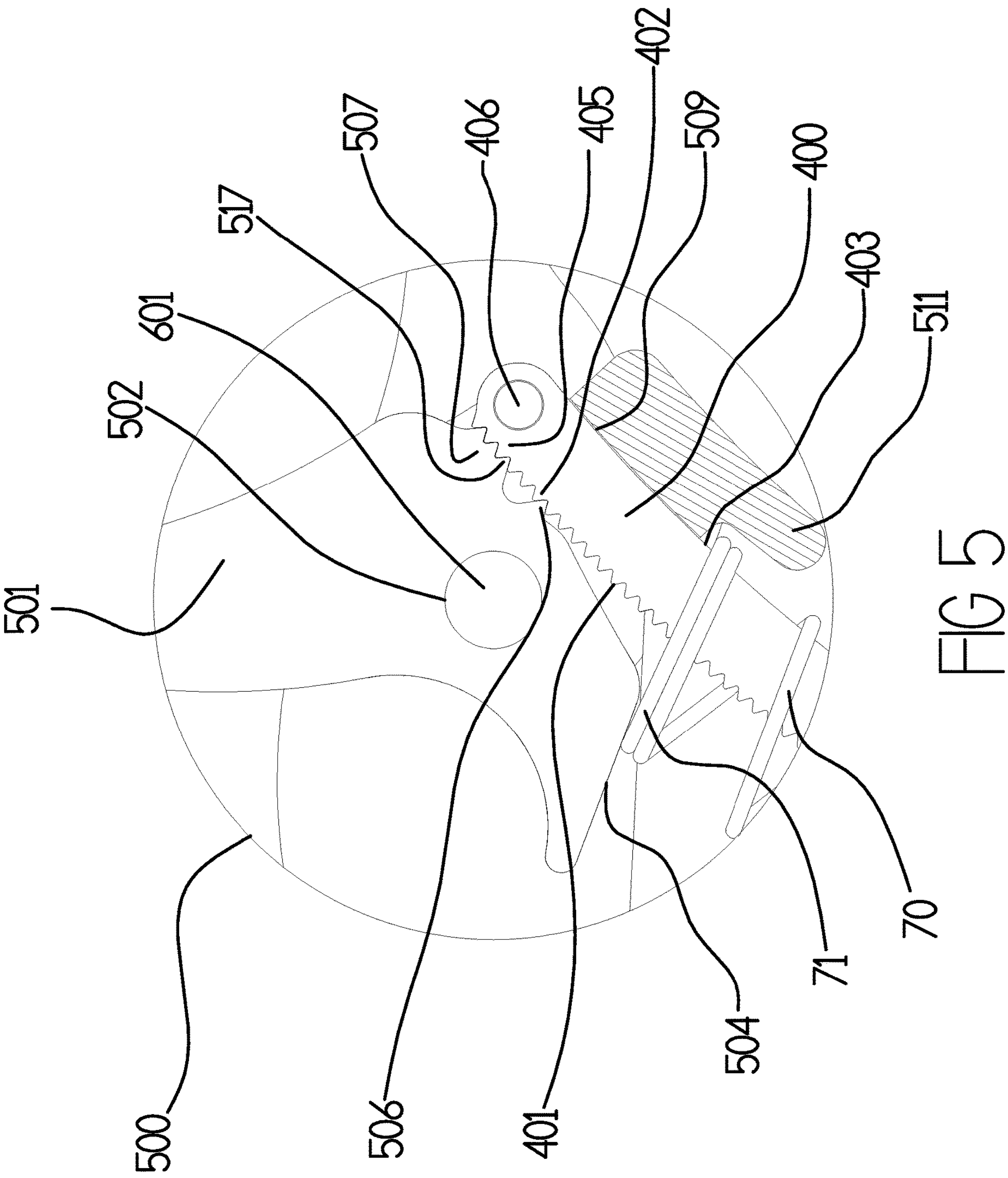
FIG. 5 is a close up view of the pivotal switch in the closed position, the switch housing top laminate shown removed for illustration purposes.

FIG. 5 is a close up view of the pivotal switch 500 in the closed position, the switch housing top laminate 514 (not shown) removed for illustration purposes. Comprising a pivotal actuator 501, actuator pivot hole 502 with its corresponding pivot pin 601. The locking teeth 506 and in this illustrated example locking stop 507, teeth 517 meshed with the pivotal strut 400, toothed face 401, teeth 402. The pivotal strut back face 403 adjacent the housing guide block face 509 the strut stop 406 within the strut outer end 405, housing spring alignment projection 511, spring operating face 504, strut spring 70 and strut spring end 71.

Figure 6:
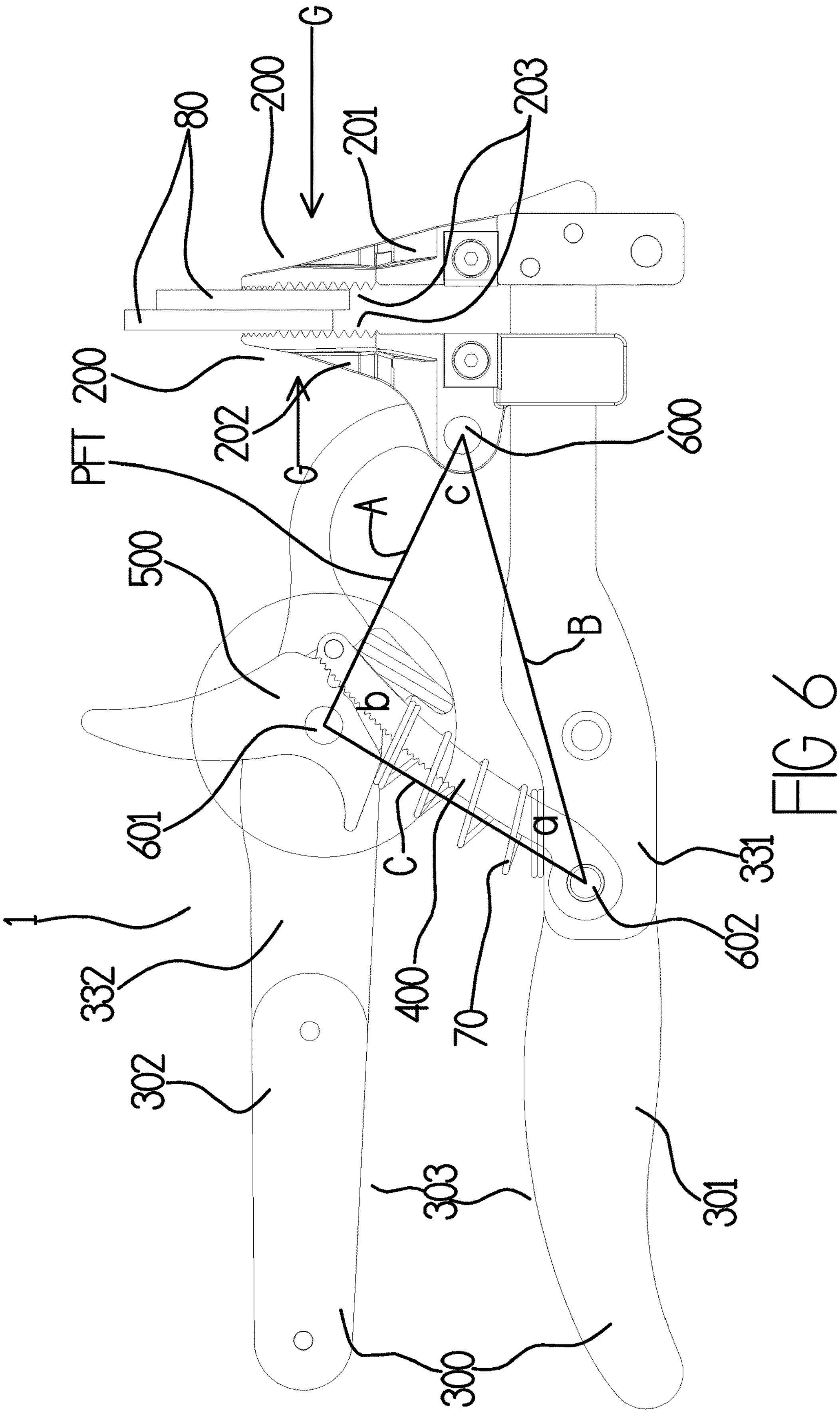
FIG. 6 is a schematic plan view of the inner metal frame and jaws of the pliers, without the handle covers, the moving handle, fixed handle outer handle plates and switch top outer housing laminate are shown removed for display purposes. The pliers are shown operated gripping a workpiece.

FIG. 6 is a schematic plan view of the inner metal frame 331, 332 and jaws 201, 202 of the pliers, without the handle covers 313, 314 (not Shown), the moving handle 302, fixed handle 301, outer handle plates 310, 311 and switch top outer housing laminate 514 (not shown) removed for display purposes. Illustrating the jaw 201, 202 closure sequence employed. The pivotal force triangle PFT, formed by the moving jaw pivot pin 600 (*c*), the switch pivot pin 601 (*b*) and strut pivot pin 602(*a*). When the plier grips 303 are operated the handles 301,302 are propelled towards one another, the strut 400 being pivotal at the fixed end 404 around its pivot pin 602(*a*) within the fixed handle 301. When the jaws 201, 202 initially grip the workpiece 80, the strong strut spring 70, in the first sequence largely prevents the moving handle 302 moving down the pivotal strut 400 (*b*) towards (a), the base B of the triangle PFT lengthening as the path of least resistance, usefully propelling the moving jaw 202 towards the fixed jaw 201 until it is arrested by any workpiece 80 gripped G between the jaws 201, 202 gripping faces 203. All pivot points 602(*a*), 601 (*b*), 600 (*c*) of the triangle PFT pivoting as required, during continued handle 301, 302 closure, the jaw gripping faces 203 first abut the workpiece 80 gripped G, the major pivot point now converts to the jaw fulcrum pin 600 (*c*) whereas the strut spring 70 is compressed as the strut 400 passes through the switch 500 ratchet mechanism 501, 601, 506 shortening the triangle PFT face C and forcefully lengthening the base B, the clenching force Cf applied to the said handles 301, 302 now providing an improved handle 300 to jaw 200 gripping force G.

Figure 7:
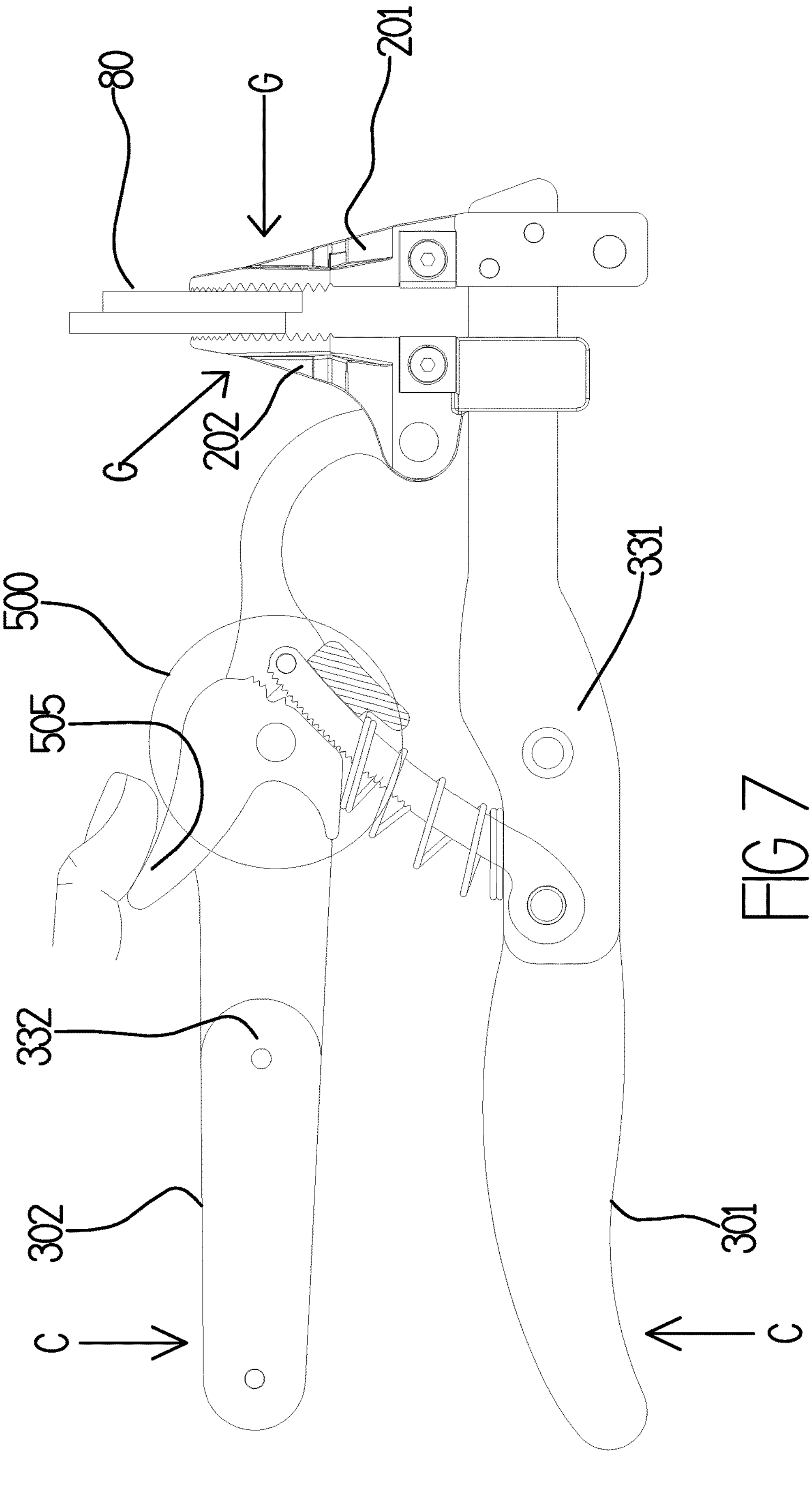
FIG. 7 is a schematic plan view of the inner metal frame and jaws of the pliers, without the handle covers, the moving handle, fixed handle outer handle plates and switch top housing laminate are shown removed for display purposes. The pliers are shown operated gripping a workpiece the handles being clenched and the switch being operated to release the gripping action.

FIG. 7 is a schematic plan view of the inner metal frame 331, 332 and jaws 201, 202 of the pliers 1, without the handle covers 313, 314 (not Shown), the moving handle 302, fixed handle 301 outer handle plates 310, 311 and switch top outer housing laminate 514 (not shown) removed for display purposes. The jaws 201, 202 are shown operated gripping a workpiece 80 the handles 301, 302 being clenched C and the switch 500, toggle lever 505 being operated to release the gripping action G.

Figure 8:
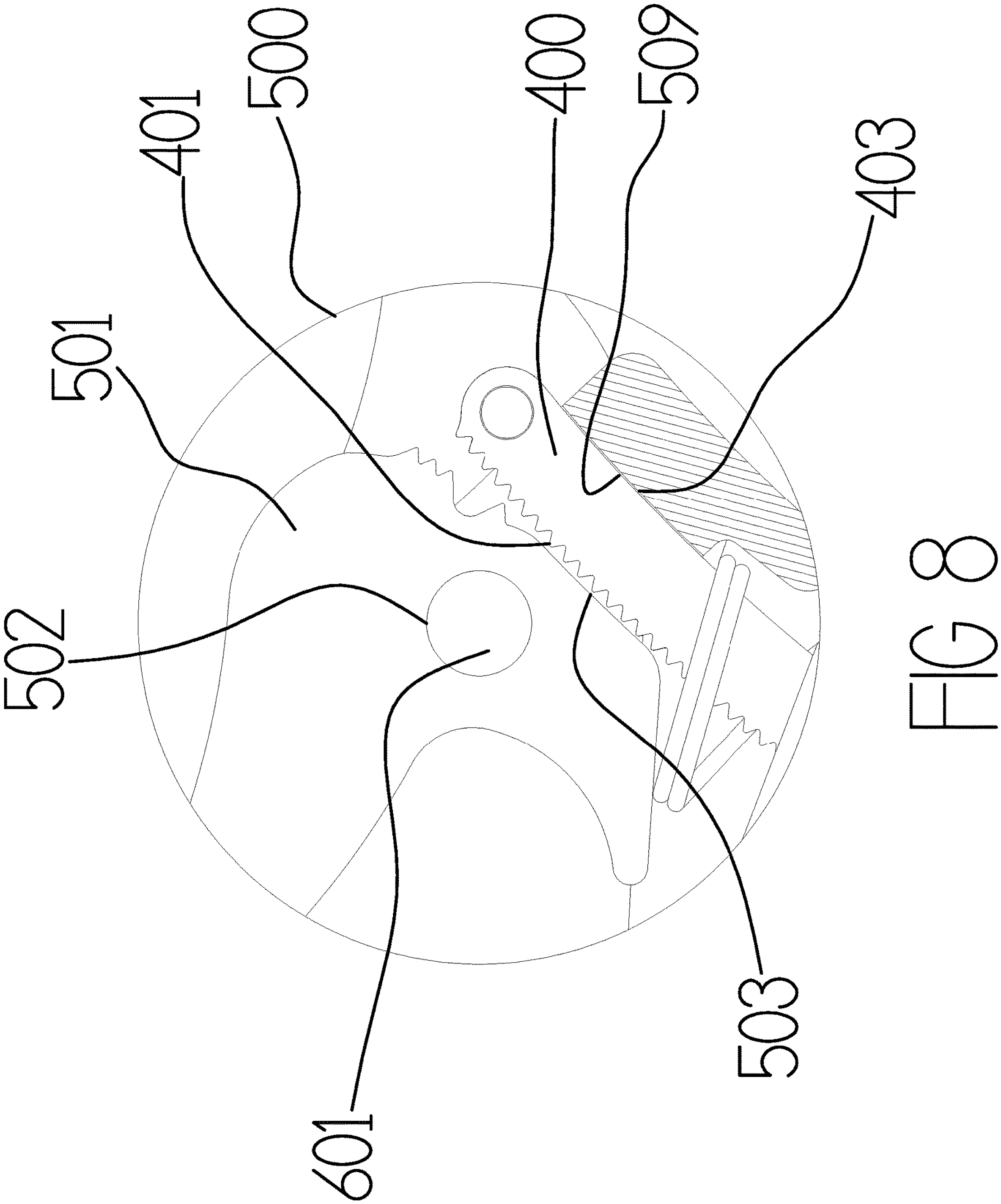
FIG. 8 is a close up view of the pivotal switch in the open operated position, the housing switch top laminate shown removed for illustration purposes.

FIG. 8 is a close up view of the pivotal switch 500 in the operated open position, the switch housing top laminate 514 (not shown) removed for illustration purposes. Comprising a pivotal actuator 501, actuator pivot hole 502 with its corresponding pivot pin 601. The smooth guide portion 503 opposite the pivotal strut 400, toothed face 401. The pivotal strut back face 403, adjacent the housing guide block face 509.

Figure 9:
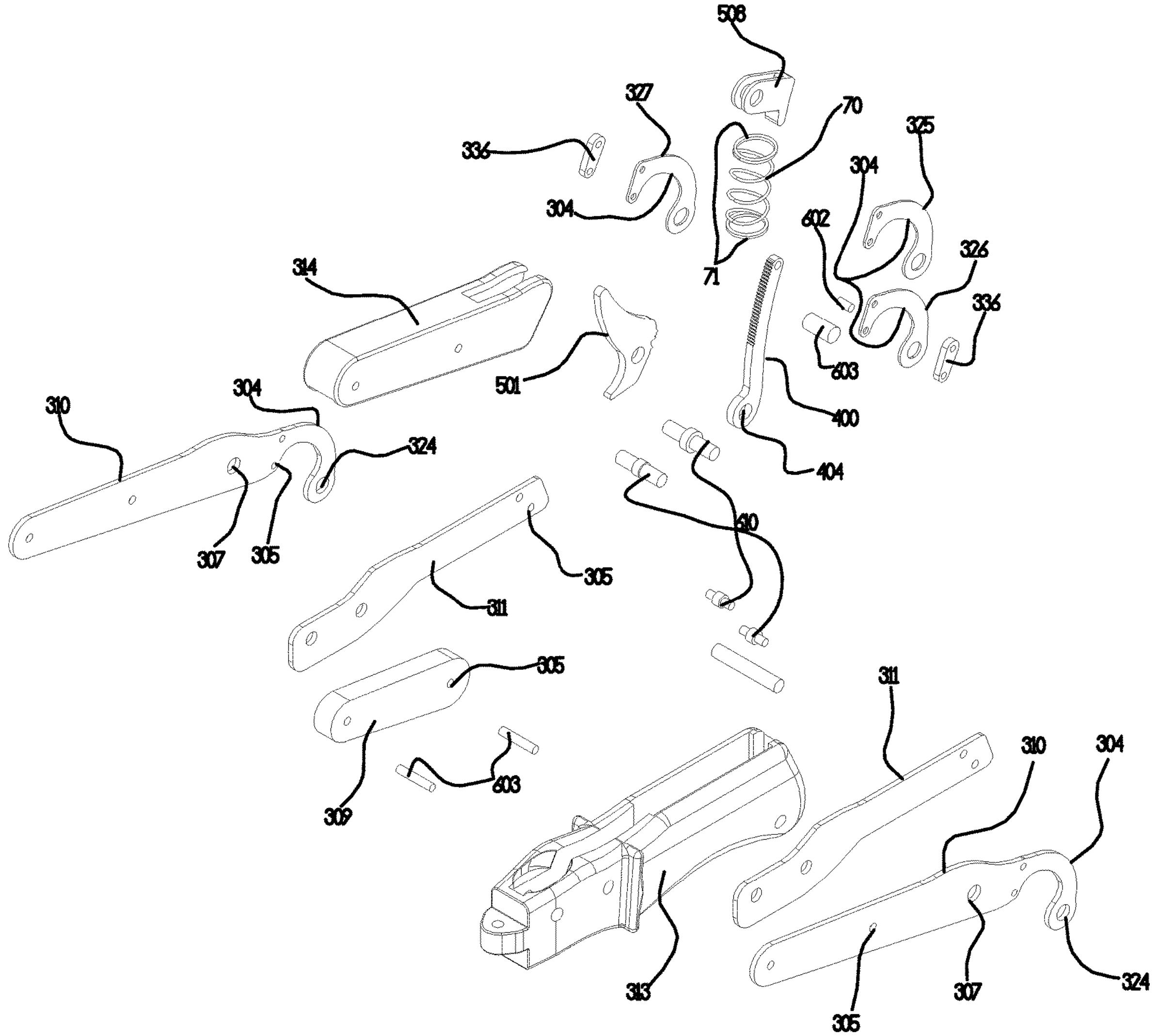
FIG. 9 is a perspective view of the Portable Vice Pliers the main parts shown dismantled for display purposes.

FIG. 9 is a perspective view of the Portable Vice Pliers the main parts shown dismantled for display purposes.

Figure 10:
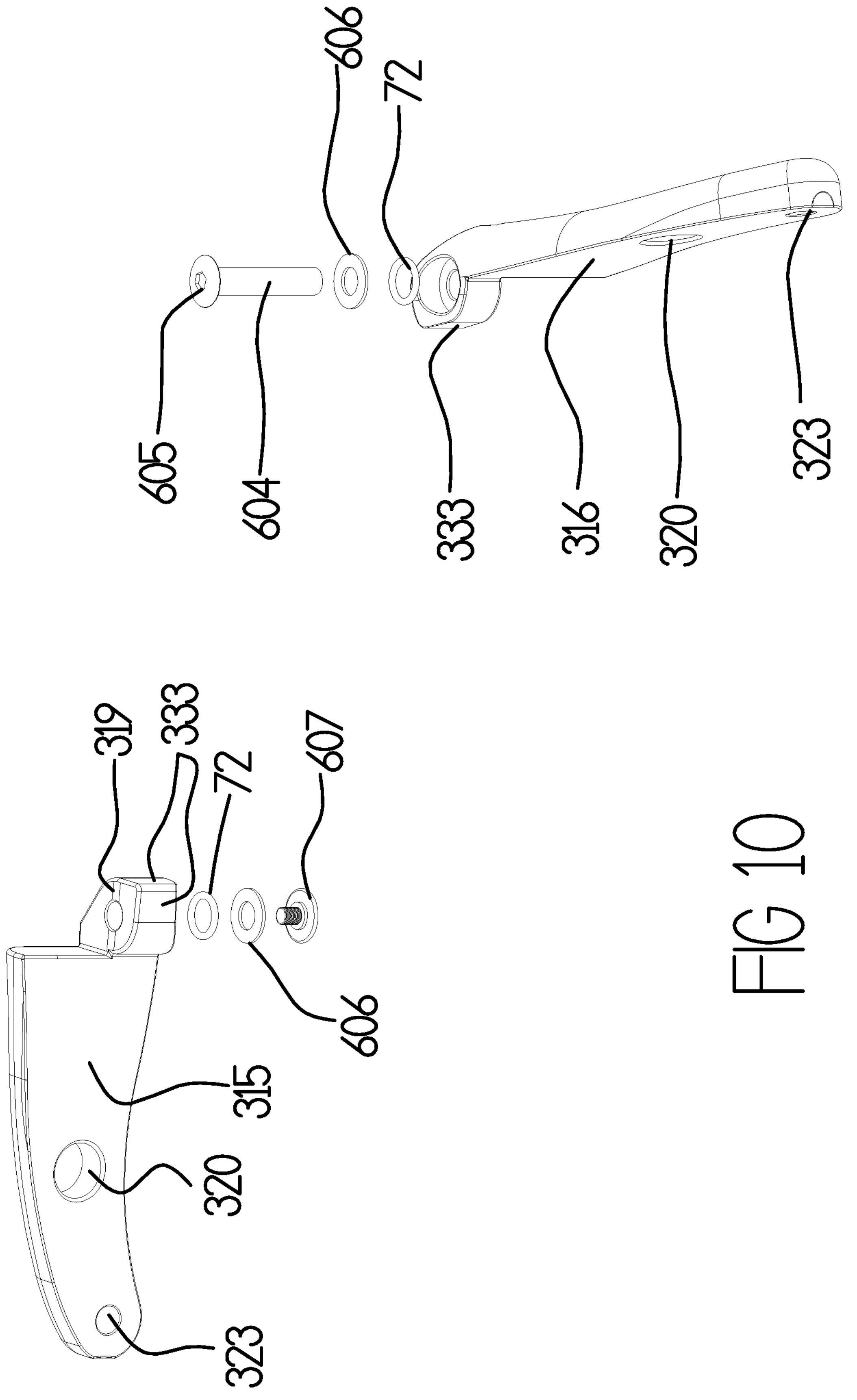
FIG. 10 is a perspective view of the fold out legs, the parts shown dismantled for display purposes.

FIG. 10 is a perspective view of the fold out legs, the parts shown dismantled for display purposes.

Figure 11:
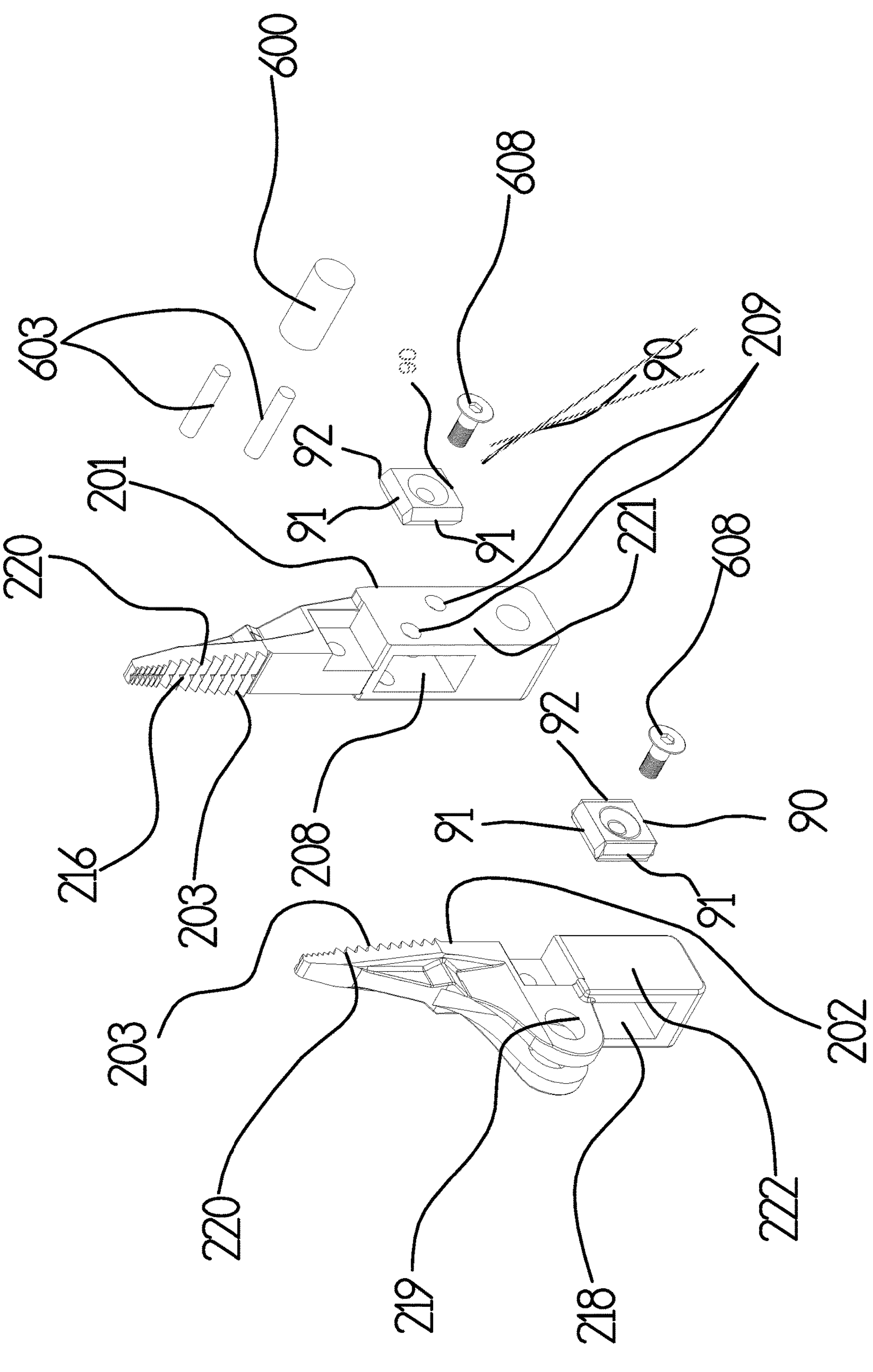
FIG. 11 is a perspective view of the moving and fixed jaws the parts shown dismantled for display purposes.

FIG. 11 is a perspective view of the moving and fixed jaws the parts shown dismantled for display purposes.

Figure 12:
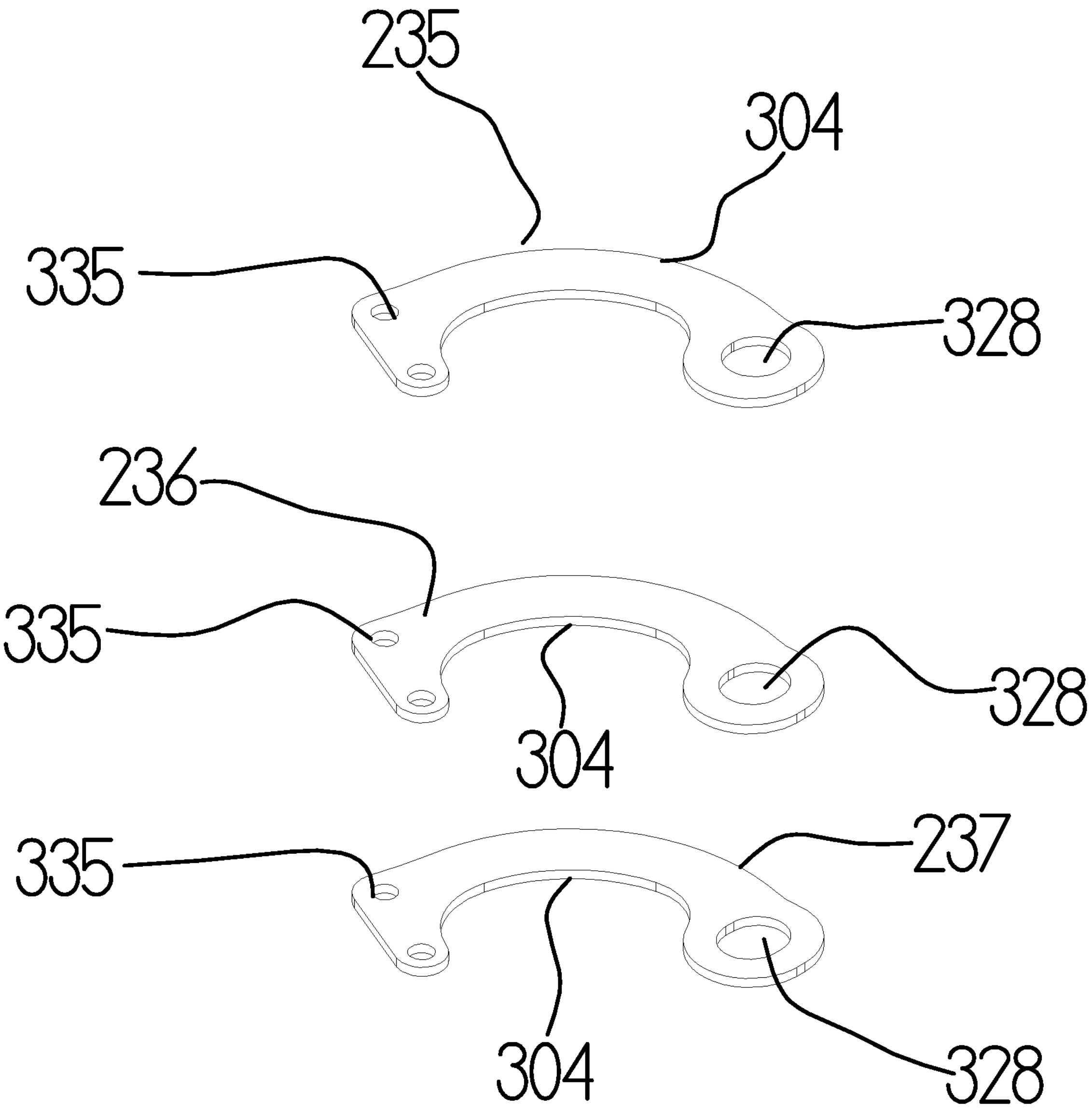
FIG. 12 is a perspective view of the further bend promoting laminates the parts shown dismantled for display purposes.

FIG. 12 is a perspective view of the further bend promoting laminates the parts shown dismantled for display purposes.

In the following description of the embodiments like parts of the Vice Grip Pliers will be referred to by the same reference numbers.

The invention provides Portable Vice Pliers 1 comprising in the first embodiment A main fixed handle 301 incorporating two swivel out arms 315, 316 which when opened out form a very stable three legged base 317 such to allow the fixed handle 301 to be placed on a table or the like with the three base legs or feet 317 protruding downwards such as to form a stable base 317 for the pliers 1 operation, the moveable arm 302 can now be manually operated by one hand usefully leaving the other hand to position the workpiece 80.

The first embodiment of the invention is the method whereas when the arms 315,316 are folded out to form a base 317 and the fixed handle feet 317 are placed on say a bench the jaws 200 are in best practice positioned generally upright enabling any work piece 80 held within the jaws 200 to be most accessible.

The second embodiment of the invention is the method whereas the moving jaw 202 when the moving handle 302 is operated, closes in a substantially parallel manner upon the fixed jaw 201, providing a superior grip upon flat or generally square like workpieces 80.

The moving jaw 202 traverses as required along the fixed jaw slide bar portion 206, the incorporated corresponding moving jaw slide jaw recess 213 tolerances ensuring that the moving jaw 202 remains at the preordained set angle to that of the fixed jaw 201 which is further robustly affixed to the slide bar portion 206 by its correspondingly sized fixed jaw slide bar recess 213 and associated fixing holes 214 corresponding to those within the slide bar to fixed jaw junction 207.

The third embodiment of the invention is the jaw 201,202 closure sequence employed. The pivotal force triangle PFT, formed by the moving jaw pivot pin 600 (*c*), the switch pivot pin 601 (*b*) and strut pivot pin 602 (*a*). When the plier grips 303 are operated the handles 301,302 are propelled towards one another, the strut 400 being pivotal at the fixed end 404 around its pivot pin 602(*a*) within the fixed handle 301. When the jaws 201,202 initially grip the workpiece 80, the strong strut spring 70, in the first sequence largely prevents the moving handle 302 moving down the pivotal strut 400 (*b*) towards (a), the base B of the triangle PFT lengthening as the path of least resistance, usefully propelling the moving jaw 202 towards the fixed jaw 201 until it is arrested by any workpiece gripped G between the jaws 201,202 gripping faces 203. All pivot points 602(*a*), 601 (*b*), 600 (*c*) of the triangle PFT pivoting as required, during continued handle 301, 302 closure, the jaw gripping faces 603 first abut the workpiece 80 gripped G, the major pivot point now converts to the jaw fulcrum pin 600 (*c*) whereas the strut spring 70 is compressed as the strut 400 passes through the switch ratchet mechanism 500, shortening the triangle PFT face C and forcefully lengthening the base B, the clenching force Cf applied to the said handles 301, 302 now providing an improved handle 300 to jaw 200 gripping force G ratio in order to securely grip G the workpiece 80 held.

The invention portable vice pliers 1 even further includes, in the fourth embodiment a swivel lock or actuator 501 situated within the switch housing 508, the actuator 501 comprising a toggle lever 505, a toothed engagement portion 506, a pivot bore 502, a spring abutment face 504, smooth guide portion 503, a locking stop portion 507 and an actuator release lock recess 516.

The housing 508 and its internal pivotal actuator 501 both rotate according to the operated movement and angle of the toothed strut 400. The pivotal switch 500 pivoting as required around the switch pivot pin 601 ensuring the pivotal switch 500 remains in complete engagement and alignment with the corresponding toothed strut 400 at all times, thereby ensuring positive engagement between the teeth 402 of the toothed strut 400 and the locking teeth 506 of the switch actuator 501. The rotation of the switch 500 with the toothed strut 400 therefore being capable of compensating for the obscure changes in angles as the moving handle 302 pivots relative to the other fixed handle 301 and as the handle bend promoting portions 304 flex as differing pressures C are applied to the handles 301, 302 during use, any normal locking switch being rendered suspect as the angle (b) of the strut teeth 402 to that of the switch teeth 506 and the guide block 509 changes as the handles 301, 302 pivot and flex which in prior art switch designs would prevent the teeth 402, 506 interlocking sufficiently to provide a dependable locking mechanism 500.

The housing 508 integral smooth guide block guide face 509 providing sufficient span against the opposing smooth surface of the strut back face 403 to ensure the adjoining surfaces 509, 403 remain substantially parallel in all situations.

The fifth embodiment of the invention is the utilization of bowed resilient portions 304 within the moving handle providing a superior plurality of graded sprung grip strengths available to usefully provide constant jaw 201,202 clamping pressure of the part or parts 80 clamped whilst with correct use normally preventing surface damage to the parts 80 clamped. The bend promoting portion 304 utilized to provide the sprung grip G is in best practice provided by planar stamped sprung metal laminations 304, 325, 326, 327 etc. so configured that as the workpiece 80 is clamped G and the sprung grip G is initiated the sprung grip G can be intensified according to operator requirements as further laminations 325, 326, 327 etc. are incorporated in the sprung grip G sequence. The most cost effective method of achieving this is to in best practice have outer plates 310 incorporating the bend promoting portions 304 and further inner bend promoting laminations 325, 326, 327 etc. attached to the moving handle 302 with their opposite pivotal ends 324 having elongate jaw fulcrum pin holes 328 the length of the elongations 328 determining the point or points that the further said inner laminations 325, 326, 327 etc. come into effect stepping up the resilience of the bend promoting portion 304 accordingly.

The sixth embodiment of the invention is the utilization of a pivotal strut 400 which is pivotally attached to the fixed handle 301 by the strut pivot pin 602, when the moveable handle 302 is closed towards the fixed handle 301 as in the clamping process G, the pivotal strut locking teeth 402 ratchet against the appropriate opposing switch locking teeth 506 within the pivotal switch housing 508 pivotally affixed on the moving handle 302 by the switch pivot pin 602 as the plier handles 301, 302 are closed against in part the pressure of the strut spring 70. As the handle closing pressure C is released the opposing teeth profiles 402, 506 mesh into a locking position further propelled by the spring 70 utilised encompassing the toothed strut 400, thereby usefully locking the plier jaws 201, 202 closed upon the workpiece 80, the rotation of the sets of opposing locking teeth 402, 506 being chosen to prevent inadvertent disengagement during pliers 1 use.

The seventh embodiment of the invention 1 is the utilization of a said compression spring 70 encompassing the said pivotal link 400, this said spring 70 conveniently propels the said handles 301, 302 towards their open position when the said switch 500 is unlocked and the said handles 301, 302 are relaxed. The said strong spring 70 further largely prevents lateral movement of the said moving handle 302 down the said pivotal strut 400 during the initial said clenching C of the said handles 301, 302, ensuring that the said moving handle 302 can usefully pivot around the said switch pivot 601 in the first instance until the said converging jaws 201,202 both contact the said workpiece 80. The said spring 70 can be further usefully utilized to operate the said switch 500.

The eighth embodiment of the invention 1 even further comprises a method whereby the fold out arms 315,316 can usefully employ recesses and apertures 323 at their extremities in order to facilitate the fitment of a lanyard or cord 94 so that the pliers 1 employing the lanyard 94 can be now usefully hung from around the users neck or such and when the pliers arms 315,316 are folded out the pliers 1 can be usefully stably positioned on say the chest of the user whereby in one of the pliers 1 many functions it can be utilised to lock in a vice like way upon say, a fishing hook 81 in order to facilitate the tying of various lure type materials such as feathers onto the said hook 81, the pliers 1 operator if in a situation such as aboard a small fishing boat has now a far more stable platform in which to perform this function, as opposed to a situation whereby a portable vice attached to the boat is employed, in the present invention the pliers 1 and workpiece 80 usefully goes up and down with the operator whereas the boat attached type vice goes up and down with the boat, which is a problem as and when the boat is subjected to any swell as this creates a situation that negates any precision work being accomplished.

The ninth embodiment of the invention 1 even further comprises a method whereas the legs 315, 316 when folded out or in can usefully lock in the folded out or in position. The fixed handle legs 315, 316 having locking protrusions 318 which when folded out lock into further locking indentations 319 on the opposing leg 315 or 316. The folding leg pivot pin screw 604 retaining a resilient portion 72 comprising of known wave washers or thick O rings that are held within the length of the said screw 604 between the screw head 605, retaining washers 606 and screw nut 607 such that as the legs 315, 316 said locking protrusions 318 are resiliently held within the corresponding indentations 319 yet capable of exiting the indentations 319 against the resilient portions 72 during the fold out or fold in process. The fold out legs 315, 316 having further generally flat pivotal stops 330 which further help to position the said legs 315, 316 in either their fold out or fold in locations.

The tenth embodiment of the invention 1 even further comprises a method whereby the arms 315, 316 when folded in can further lock in the folded in position in order to form a uniform fixed handle 301 for normal pliers 1 use. Whereas small strong magnets 321 are held within the faces of the opposing handle legs 315, 316. The invention 1 further includes a method whereas the points of surface contact employed by the three or optimally more feet 317 of the fixed handle 301 can further usefully employ magnets 321 within their confines in order to facilitate a quick and simple attachment force upon any metal surface utilized.

The eleventh embodiment of the invention 1 even further comprises a method whereas the jaws 301, 302 instead of the normal incorporated cutters or snips 90 can usefully incorporate a recess 211 for the generally flat fitment of an interchangeable or replaceable cutting 91/anvil portion 92, the flat four sided cutting portions 91 having in best practice three cutting faces 91 and one anvil 92 in order to facilitate the maximum spare cutters 91 whilst retaining the options of cutter 91 to anvil 92, cutter 91 to cutter 91 and anvil 92 to anvil 92 requirements, the cutting portion 90 is substantially square both the cutting faces 91 and the generally flat faced anvils 92 are at right angles to each other in order to provide a system whereby when suitably installed in the correspondingly sized jaw recess 218 by the provision of a screw 608 or the like through a corresponding bore 93 within the cutting portion 90 either the cutter 91 or anvil surface 92 face outwards from the jaw recess 218, the opposing cutting 91 or anvil faces 92 being usefully positioned by the jaw recesses 218 such as to ensure the best possible alignment of the working surfaces of the cutters 91 or anvils 92 in order to provide efficient cutting or crimping when the pliers 1 are used for this purpose, the shape or profile of the cutters 91 can also be usefully changed to provide many other plier or crimp like functions.

The twelfth embodiment of the invention 1 even further comprises a method whereas when the moving handle 302 is operated the jaws 201, 202 close in a substantially parallel manner, thereby when the jaws gripping profiles 203 include a lateral groove 217, in best practice consisting of a V shaped channel providing a superior grip upon thin generally cylindrical shaped workpieces such as fishing hook 81 shanks. When usefully combined with gripping face teeth 220 that recess into one another instead of the prior art generally peak to tooth peak grip, the grip Gf of fine rod or wire like structures is greatly improved.

The thirteenth embodiment of the invention 1 even further comprises a method whereas in order to lessen the weight of the pliers 1 yet increase the ergonomic use of the pliers 1 the jaws 201, 202 are preferably attached to metal handle frames 331, 332 which are further attached to corresponding preferably plastic moulded fixed 313 and moving 314 handle grips. If strong lightweight plastics are used and as a further improvement a blowing agent is used during the plastic moulding process the inside of the mouldings are full of small bubbles yet the outside face is as smooth as normal. With careful construction choices, the pliers 1 dependant on the fluid they are dropped in may float or at least sink slowly enabling the pliers 1 to be recovered, a worthwhile attribute to a fisherman.

The fourteenth embodiment of the invention 1 even further comprises a method whereas the jaws 201, 202 are preferably replaceable with other jaw 201, 202 type configurations in order that the pliers 1 can be utilised in many differing marketplaces, fishing, electronics, electrical to mention but a few. The methods of attachment of the fixed and moving jaws 201, 202 being of known screws 603 or the like.

The invention may provide Portable Vice Pliers comprising pliers wherein the main fixed handle incorporates two swivel out arms which when opened out form with the aid of a further protrusion at the opposite jaw end of the fixed handle a very stable three legged base such to allow the fixed handle to be placed on a table or the like with the three base legs or feet protruding downwards such as to form a stable base for the pliers operation, the moveable arm can now be manually operated by one hand usefully leaving the other hand to position the workpiece.

The invention may also include a method whereas when the arms are folded out to form a base and the fixed handle feet are placed on say a bench the jaws are positioned generally upright enabling any work piece held within the jaws to be most accessible.

The invention may also include a method whereas the jaws when the moving handle is operated close in a substantially parallel manner, providing a superior grip upon flat or generally square like workpieces.

The invention may also include a method whereas the jaws when the moving handle is operated close in a substantially parallel manner, thereby when the jaws gripping profiles include a lateral groove in best practice consisting of a V shaped channel providing a superior grip upon thin generally cylindrical shaped workpieces such as fishing hook shanks. When usefully combined with gripping face teeth that recess into one another instead of the prior art generally peak to tooth peak grip, the grip of fine rod or wire like structures is greatly improved.

The invention may also include a method whereas the arms when folded out can usefully lock in the folded-out position.

The invention may also include a method whereby the arms when folded in can further lock in the folded in position in order to form a uniform handle for normal pliers use.

The invention may also include a method whereby the fold out arms can usefully employ recesses and apertures at their extremities in order to facilitate the fitment of a lanyard or cord so that the pliers employing the lanyard can be now usefully hung from around the users neck or such and when the pliers arms are folded out. The pliers can be usefully stably positioned on say the chest of the user whereby in one of the pliers many functions it can be utilised to lock in a vice like way upon say, a fishing hook in order to facilitate the tying of various lure type materials such as feathers onto the said hook, the pliers operator if in a situation such as aboard a small fishing boat has now a far more stable platform in which to perform this function, as opposed to a situation whereby a portable vice attached to the boat is employed, in the present invention the pliers and workpiece usefully goes up and down with the operator whereas the boat attached type vice goes up and down with the boat, which is a problem as and when the boat is subjected to any swell as this creates a situation that negates any precision work being accomplished.

The invention may also include a method whereas the points of surface contact employed by the three feet of the fixed handle of a further optimal example of the pliers can further usefully employ magnets within their confines in order to facilitate a quick and simple attachment force upon any metal surface utilized.

The invention may also include a method whereas magnets can further be usefully utilized to aid the locking closure of the fold out arms in the normal pliers handle providing a secure normal plier fixed handle profile.

The invention may also include a method whereas the set of pliers comprises a head portion incorporating gripping faces within the opposing jaws for the clamping of the desired workpiece, pivotal handle portions and a sprung toothed link positioned between the handles. Bow shaped resilient portion or portions can be usefully incorporated within either or both the jaw or handle portions, the examples shown are the most cost effective option, when the pliers are operated these resilient portions impart a useful superior sprung pressure upon the clamped workpiece by the gripping face of the jaws. The moving handle and bend promoting portion are contiguous with each other in the best practice example of construction. The jaws can further be usefully locked in the required clamping position upon the workpiece by a toothed strut pivotally attached to the fixed handle and conveniently being locked or unlocked according to the locking switch pivotal within the opposing moving handle.

The invention may comprise bowed resilient portions within the moving handle providing a superior plurality of graded sprung grip strengths available to usefully provide constant jaw clamping pressure of the part or parts clamped whilst normally preventing surface damage to the parts clamped. The bend promoting portion utilized to provide the sprung grip is in best practice provided by planar stamped sprung metal laminations so configured that as the workpiece is clamped and the sprung grip is initiated the sprung grip can be intensified according to operator requirements as further laminations are incorporated in the sprung sequence. The most cost effective method of achieving this is to in best practice have outer plates incorporating the bend promoting portions and further inner bend promoting laminations attached to the moving handle with their opposite pivotal ends having enlarged or elongate jaw fulcrum pin holes, the length of the elongations determining the point or points that the further said inner laminations come into effect stepping up the resilience of the bend promoting portion accordingly.

The resulting pliers can have reasonably soft gripping pressures for gripping soft materials like lead soldiers or electronic chips or the like in the first instance and when the further stronger sprung laminates are employed hardened steel hooks or any other object requiring a robust grip while being worked on.

The invention can further incorporate clamping widths within its specification that are automatically adjusted, the locking pressure can be further be usefully determined by the operator by the straightforward gripping pressure of the handles, the simple release of the handles initiating the locking of the jaws upon the clamped parts.

Examples of the invention may be operable on a reasonable range of workpiece sizes and shapes whilst utilizing superior sprung gripping force of the workpiece. Furthermore, the main frame parts are capable of being stamped in order to further reduce their manufacturing cost.

The invention may also include, a compression spring encompassing the toothed pivotal link, this spring conveniently propels the handles towards their open position when the switch is unlocked and the handles are relaxed. The strong spring largely prevents lateral movement of the moving handle down the pivotal strut during the initial clenching of the handles, ensuring that the moving handle can usefully pivot around the switch pivot in the first instance until the converging jaws both contact the workpiece. This spring can be further usefully utilized to operate the pivotal switch.

The invention may also include, a pivotal switch whereas the guide block which is required to remain substantially opposite the switch teeth is incorporated within the pivotal switch housing instead of being typically statically affixed to the handle outer plates. Comprising a swivel lock or actuator situated within the switch housing, the actuator comprising a toggle lever, a toothed engagement portion, a pivot bore, a spring abutment face, smooth guide portion, a locking stop portion and an actuator release lock recess.

The housing and its internal pivotal actuator both rotate according to the operated movement and angle of the toothed strut. The pivotal switch pivoting as required around the switch pivot pin ensuring the pivotal switch remains in complete engagement and alignment with the corresponding toothed strut at all times, thereby ensuring positive engagement between the teeth of the toothed strut and the locking teeth of the switch actuator. The rotation of the switch with the toothed strut therefore being capable of compensating for the obscure changes in angles as one handle pivots relative to the other and as the handle bend promoting portions flex as differing pressures are applied to the handles during use, any normal locking switch being rendered suspect as the angle of the strut teeth to that of the switch teeth and the guide block change as the handles pivot and flex which in prior art switch designs would prevent the teeth interlocking sufficiently to provide a dependable locking mechanism.

The housing integral smooth guide block guide face providing sufficient span against the opposing smooth surface of the strut back face to ensure the adjoining surfaces remain substantially parallel in all situations.

When the plier grips are operated, the handles are propelled towards one another, the strut being pivotal at the fixed end around its pivot pin within the fixed handle. When the jaws initially grip the workpiece the strong strut spring continued handle clenching now compresses the strut spring, the pivotal switch within the moving handle progressing as urged down the length of the strut towards the fixed handle. The strut locking teeth semi-engaging the pivotal switch actuator toothed engagement portion, this engagement of the switch teeth and the corresponding toothed strut further rotating the actuator and its corresponding teeth out of engagement with the strut engagement teeth in a ratchet like manner, against the resilience of the strut spring, the generally smooth back face of the toothed strut being robustly positioned opposite the switch teeth by the switch housing guide block. When the required gripping pressure is attained and the handle clenching grip pressure is relaxed, the resiliently bowed portions move towards their initial prestressed position whereby the actuator is rotated within the switch housing by the switch teeth engagement with the strut teeth aided by the corresponding strut spring. This action expediently engages the locking interaction between the strut teeth and the switch teeth, the locking stop whether smooth or toothed preventing undue travel. The clamping action of the jaws, being determined by the remaining resilience of the bowed portions, the elastic potential energy.

The invention may also include a method whereby part of the locking mechanism includes a pivotal strut which is pivotally attached to the fixed handle by the strut pivot pin, when the moveable handle is closed towards the fixed handle as in the clamping process, the pivotal strut locking teeth ratchet against the appropriate opposing switch locking teeth within the pivotal switch housing pivotally affixed on the moving handle by the switch pivot pin as the plier handles are closed against in part the pressure of the strut spring. As the handle closing pressure is released the opposing teeth profiles mesh into a locking position further propelled by the spring utilised encompassing the toothed strut thereby usefully locking the plier jaws closed upon the workpiece the locking rotation of the sets of opposing locking teeth being further chosen to prevent inadvertent disengagement during pliers use.

The invention may also include a safety method whereby the operator requires to first disengage the opposing locking teeth from their engaged position by applying closure pressure to the plier handles in order to reduce the force required to operate the unlocking switch incorporated into the end of the sprung arm, the simultaneous operation of the unlocking switch allows the jaws to smoothly open under the resilient tension of the jaw spring.

The invention also includes a method whereas the moving arm incorporates a bowed flexible portion in order to provide the jaws with a resilient closing pressure, the moving arm pivot joint is pivotal in relation to the jaws, the action of the toothed pivotal strut and moving handle pivotal switch locking mechanism provides an operator an adjustable level of resilient jaw gripping pressure, the bowed flexible portion usefully providing an extremely robust resilient jaw closing action whilst incurring no extra parts or cost, this resilient jaw closure provides superior gripping of less robust items compared to the pliers of the known art as the prior art pliers tend to crush the workpiece in order to provide sufficient gripping action, a further utilisation of the resilient jaw closing action is if the workpiece size alters for whatever reason after the gripping action has been completed the resilient action of the resilient bowed section of the moving handle would usefully compensate.

The invention may also include a method whereas the jaws instead of the normal incorporated cutters can usefully incorporate a recess for the generally flat fitment of an interchangeable or replaceable cutting/anvil portion, the flat four sided cutting portions having in best practice three cutting faces and one anvil order to facilitate the maximum spare cutters whilst retaining the options of cutter to anvil, cutter to cutter and anvil to anvil requirements, the cutting portion is substantially square both the cutting faces and the generally flat faced anvils are at right angles to each other in order to provide a system whereby when suitably installed in the correspondingly sized jaw recess by the provision of a screw or the like through a corresponding bore within the cutting portion either the cutter or anvil surface face outwards from the jaw recess, the opposing cutting or anvil faces being usefully positioned by the jaw recesses such as to ensure the best possible alignment of the working surfaces of the cutters or anvils in order to provide efficient cutting or crimping when the pliers are used for this purpose, the shape or profile of the cutters can also be usefully changed to provide many other plier or crimp like functions.

The invention may also include a method whereas in order to lessen the weight of the pliers yet increase the ergonomic use of the pliers the jaws are preferably attached to metal handle frames which are further attached to corresponding preferably plastic moulded fixed and moving handle covers or grips.

The invention may also include a method whereas the jaws are preferably replaceable with other jaw type configurations in order that the pliers can be utilised in many differing marketplaces, fishing, electronics, electrical to mention but a few. The methods of attachment, of the fixed and moving jaws, being of known screws or the like.

The invention may also include a method whereas the complex shaped jaws can be preferably injection moulded utilising a method termed Metal Injection Moulding or MIM, as this is a costly process yet extremely accurate, the size of the moulded parts should be kept to a minimum in order to achieve maximum cost savings, to this end only the complex parts of the pliers are moulded the less expensive stamped handle frames etc. being attached to the jaws by known means such as rivets.

The invention may also include a method whereas the legs rotationally mounted on the fixed handle have protrusions upon the circumference of the axis pin housing which act as useful stops against the fixed handle such as to locate the legs in their closed position or fully open position as required, further protrusions and corresponding locking indentations are preferably utilised upon the mating surfaces of the legs to the fixed handle, the fixed handle folding leg pivot pin further retaining a resilient member or members at its extremities in order to provide the lateral movement to allow the legs to engage or disengage the leg locking mechanism.

Thus, although there have been described particular embodiments of the present invention of a new and useful Hand Operated Gripping Tools it is not intended that such references be construed as limitations upon the scope of this invention except as set forth in the following claims.

What is claimed is:

1. A hand operated gripping tool comprising:

a fixed handle;

a fixed jaw connected with said fixed handle;

a movable handle pivotably connected with said fixed handle for pivoting movement relative to said fixed handle; and a movable jaw connected with said movable handle for movement relative to said fixed jaw, wherein said fixed handle comprises a first portion to which said fixed jaw is fixed and second and third portions movable from a first position in which each forms a continuation of said first portion and a spread position in which said first, second and third portions define a tripod base.

2. A hand operated gripping tool as claimed in claim 1, wherein said second and third portions are pivotably connected with a first end of said first portion.

3. A hand operated gripping tool as claimed in claim 2, wherein said fixed jaw is fixed to said first portion at a second end of said first portion.

4. A hand operated gripping tool as claimed in claim 1, wherein said movable jaw is slideable on said fixed handle towards said fixed jaw in response to movement of said movable handle towards said fixed handle.

5. A hand operated gripping tool as claimed in claim 1, wherein said movable handle is pivotably connected with said fixed handle via said movable jaw.

6. A hand operated gripping tool as claimed in claim 1, further comprising a locking mechanism to lock said second and third portions in said first position.

7. A portable vice pliers comprising:

a fixed handle;

a fixed jaw connected with said fixed handle;

a movable handle pivotably connected with said fixed handle for pivoting movement relative to said fixed handle; and a movable jaw connected with said movable handle, wherein said movable handle is operable to cause said movable jaw to slide towards said fixed to jaw, and wherein said fixed handle comprises a first portion to which said fixed jaw is fixed and second and third portions movable from a first position in which each forms a continuation of said first portion and a spread position in which said first, second and third portions define a tripod base.

* * * * *